US012285948B2

(12) United States Patent
Teoh et al.

(10) Patent No.: US 12,285,948 B2
(45) Date of Patent: Apr. 29, 2025

(54) SPITTING OPERATIONS FOR PRINTHEADS

(71) Applicant: Hewlett-Packard Development Company, L.P., Spring, TX (US)

(72) Inventors: Wei Lit Teoh, Singapore (SG); Kian Yaw Goh, Singapore (SG); Narayanasamy Periyasamy, Singapore (SG); Ban Ho Chong, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 151 days.

(21) Appl. No.: 18/022,320

(22) PCT Filed: Sep. 3, 2020

(86) PCT No.: PCT/US2020/049109
§ 371 (c)(1),
(2) Date: Feb. 21, 2023

(87) PCT Pub. No.: WO2022/050941
PCT Pub. Date: Mar. 10, 2022

(65) Prior Publication Data

US 2024/0034067 A1 Feb. 1, 2024

(51) Int. Cl.
*B41J 2/165* (2006.01)

(52) U.S. Cl.
CPC ................................ *B41J 2/16523* (2013.01)

(58) Field of Classification Search
CPC .... B41J 2/16523; B41J 2/1721; B41J 2/1742; B41J 2/16526; B41J 2/16508
See application file for complete search history.

(56) References Cited

U.S. PATENT DOCUMENTS

| | | | | |
|---|---|---|---|---|
| 6,533,384 | B1 | 3/2003 | Vega et al. | |
| 2003/0067506 | A1* | 4/2003 | Rotering | B41J 2/16508 347/35 |
| 2004/0100521 | A1 | 5/2004 | Rotering | |
| 2004/0250727 | A1 | 12/2004 | Jones et al. | |
| 2006/0017829 | A1 | 1/2006 | Gallagher | |
| 2007/0165054 | A1 | 7/2007 | Shimoji | |
| 2008/0266366 | A1 | 10/2008 | Kersey et al. | |
| 2014/0063093 | A1 | 3/2014 | Weissman et al. | |
| 2014/0176628 | A1 | 6/2014 | Anderson et al. | |
| 2020/0164664 | A1 | 5/2020 | Yamamuro et al. | |

FOREIGN PATENT DOCUMENTS

| | | | |
|---|---|---|---|
| EP | 3248788 | A1 | 11/2017 |
| EP | 3659809 | A1 | 6/2020 |
| KR | 10-2007-0033030 | A | 3/2007 |
| KR | 10-2008-0073503 | A | 8/2008 |
| WO | 01/81090 | A1 | 11/2001 |
| WO | 2020/106281 | A1 | 5/2020 |
| WO | 2020/117236 | A1 | 6/2020 |

* cited by examiner

*Primary Examiner* — Thinh H Nguyen
(74) *Attorney, Agent, or Firm* — Brooks, Cameron & Huebsch, PLLC

(57) ABSTRACT

In some examples, a controller can include a processing resource and a memory resource storing instructions to cause the processing resource to determine a reservoir for a spitting operation of a printhead in an imaging device based on predetermined reservoir data, determine a spit type for the spitting operation of the printhead, and cause the spitting operation to occur in the reservoir using the determined spit type.

15 Claims, 6 Drawing Sheets

SPITTING OPERATIONS FOR PRINTHEADS

BACKGROUND

Imaging systems, such as printers, copiers, etc., may be used to form markings on a physical medium, such as text, images, etc. In some examples, imaging systems may form markings on the physical medium by performing a print job. A print job can include forming markings such as text and/or images by transferring a print material (e.g., ink, toner, etc.) to the physical medium.

DETAILED DESCRIPTION

Figure 1:
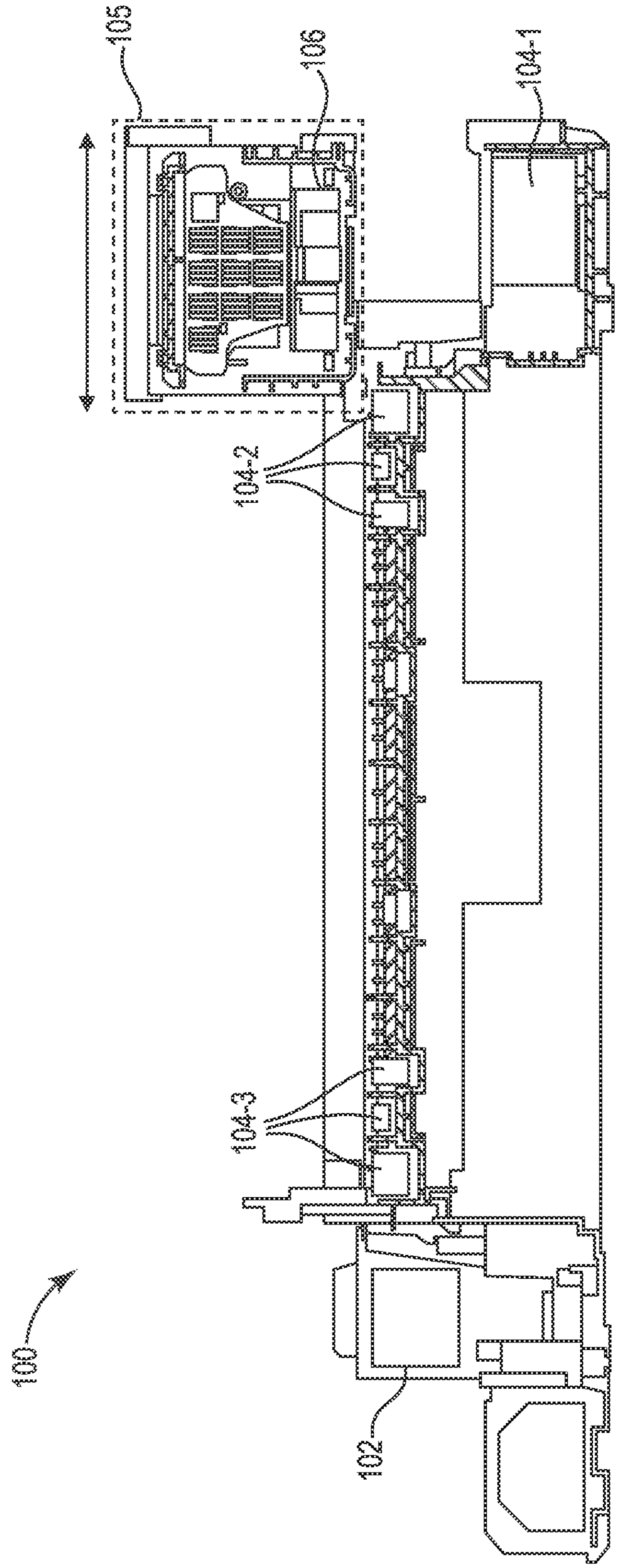
FIG. 1 is a side section view of an example of an imaging device including reservoirs for spitting operations for printheads consistent with the disclosure.

Imaging devices may include a supply of a print material. As used herein, the term "print material" refers to a substance which can be transported through and/or utilized by an imaging device. In some examples, print material can be, for instance, a material that when applied to a medium, can form representation(s) (e.g., text, images models, etc.) on the medium during a print job. Print material may include ink, toner, etc.

The print material can be deposited onto a physical medium. As used herein, the term "imaging device" refers to any hardware device with functionalities to physically produce representation(s) (e.g., text, images, models, etc.) on the medium. In some examples, a "medium" may include paper, photopolymers, plastics, composite, metal, wood, or the like. The imaging device 100 can be a printing device (e.g., a printer). The imaging device 100 can include printing, scanning, faxing, and/or other imaging device functionalities, and can perform print jobs when in receipt of a print job request from a computing device.

A device, such as a computing device, can generate a print job request and transmit the print job request to an imaging device. The imaging device can perform the print job according to the received print job request.

An imaging device can utilize a reservoir into which print material can be ejected by a printhead of the imaging device. As used herein, the term "printhead" refers to a mechanism to transfer print material to a medium via a nozzle. The printhead may eject print material to a reservoir during a spitting operation. As used herein, the term "spitting operation" refers to a process during which a particular amount of print material is ejected from a printhead for a particular amount of time. Such spitting operations can, in some examples, be performed for maintenance activities. For example, spitting operations can be performed in order to maintain health of the nozzles included as part of the printhead.

Some imaging devices may include a dedicated reservoir such that a spitting operation can eject print material to the dedicated reservoir. Some imaging devices may include a reservoir that can be replaced by a user when a volume of ejected print material exceeds a threshold amount.

While imaging devices including replaceable reservoirs can provide a way to discard ejected print material from spitting operations, replaceable reservoirs can introduce extra costs. Such imaging devices with replaceable reservoirs may not be suitable for users who do not utilize high-usage print material imaging devices. Additionally, imaging devices having a dedicated reservoir that is not replaceable may utilize mechanical devices to move discarded ejected print material from the dedicated reservoir. However, such devices can introduce additional costs in manufacturing and/or production of said imaging devices and/or limit a lifecycle of the imaging device.

Certain areas of an imaging device may be utilized as a reservoir for spitting operations. For example, areas that are located proximate to a translation axis of the printhead that may not have been initially designed as a reservoir for spitting operations may be utilized as reservoirs for spitting operations. Such use of previously unutilized spaces can increase reservoir capacity which can increase the lifecycle of the imaging device. Additionally, avoiding the use of mechanical devices and/or replaceable reservoirs can lead to cost reduction in manufacturing and/or production of imaging devices by reducing part numbers for imaging devices. Further, print job performance may be increased as spitting operations may utilize different spit types based on different reservoirs, as well as optimizing use of existing reservoir space for spitting operations. Accordingly, spitting operations for printheads, as is further described herein, can allow for extension of a lifecycle of an imaging device and/or increasing print job performance without redesign of imaging device hardware and/or use of additional mechanisms and/or replaceable reservoir space.

FIG. 1 is a side section view of an example of an imaging device 100 including reservoirs 104 for spitting operations for printheads consistent with the disclosure. The imaging device 100 can include a controller 102, reservoirs 104-1, 104-2, 104-3, and a print carriage 105. The print carriage 105 can include a printhead 106.

As illustrated in FIG. 1, the imaging device 100 can include a plurality of reservoirs 104-1, 104-2, 104-3. As used herein, the term "reservoir" refers to a receptacle to hold a material. For example, the reservoirs 104-1, 104-2, 104-3 can receive print material from the printhead 106 during spitting operations.

As described above, certain areas of the imaging device 100 may be utilized as reservoirs for spitting operations. For example, reservoir 104-1 may be a main reservoir. Reservoir 104-2 can be a secondary reservoir and reservoir 104-3 can be a tertiary reservoir. In some examples, reservoirs 104-2 and/or 104-3 may not have been initially designed as reservoirs for spitting operations, but use of such spaces can increase reservoir capacity and/or increase performance (e.g., speed and/or throughput) of the imaging device 100, as is further described herein.

The imaging device 100 can include a print carriage 105, As used herein, the term "print carriage" refers to a device that laterally translates to enable a printhead to deposit print material onto a physical medium. For example, as illustrated in FIG. 1, the print carriage 105 can translate laterally (e.g., to the left and/or to the right, as oriented in FIG. 1) to allow the printhead 106 to deposit print material onto a physical medium (e.g., not illustrated in FIG. 1). As used herein, the term “printhead” refers to a device which transfers print material to a print medium to form markings on a physical medium. For example, the printhead 106 can include nozzles (e.g., not illustrated in FIG. 1) that can eject print material, such as ink, onto a physical medium.

The imaging device 100 can include a controller 102. The controller 102 can determine a reservoir 104 from the plurality of reservoirs 104-1, 104-2, 104-3 for a type of spitting operation of the printhead 106. As used herein, the term “spitting operation” refers to ejection of print material from a printhead through a nozzle of the printhead. For example, a spitting operation can be performed by the printhead 106 for maintenance and/or to maintain the health of the printhead 106. Different types of spitting operations can be performed by the printhead 106, as are further described herein.

The controller 102 can determine a reservoir 104 for a type of spitting operation of the printhead 106 based on predetermined reservoir data. As used herein, the term “reservoir data” refers to information associated with a reservoir of an imaging device. For example, reservoir data can include information describing attributes and/or characteristics of each of the reservoirs 104-1, 104-2, 104-3, as is further described herein.

In some examples, the predetermined reservoir data can include dimensions of the reservoirs 104-1, 104-2, 104-3, Such dimensions can include dimensions describing the physical size of the reservoirs 104-1, 104-2, 104-3. For instance, secondary reservoir 104-2 may include a length dimension, a width dimension, and/or a height dimension. Additional dimensions may include spit locations within the reservoir 104. Such spit locations may be associated with a spitting operation type. For example, a spit location can be associated with a fixed point spitting type, a plurality of spitting locations can be associated with a randomized point spitting type, and a spit range can be associated with a spit-on-slew spitting type, as are further described herein.

In some examples, the predetermined reservoir data can include allowable spitting operation types. As used herein, the term “spitting operation type” refers to a group of characteristics that describe a particular manner as to how ejection of print material from a printhead through a nozzle of the printhead occurs. For example, the amount of print material, how long ejection print material occurs, the pressure at which print material is ejected, among other attributes can vary based on a spitting operation type, as is further described herein.

In some examples, a spitting operation type can include a decap spitting operation. As used herein, the term “decap spitting operation” refers to a spitting operation to restore a concentration of print material at a tip of a printhead nozzle. For example, the imaging device 100 may go unused for a period of time (e.g., not perform any print jobs) where the print material located at a tip of a nozzle of the printhead 106 can experience contact with ambient air. Such contact with ambient air may cause the concentration of the print material to vary (e.g., ambient air may cause a liquid carrier of the print material to partially evaporate) which can increase the concentration of colorant in the print material. Accordingly, a decap spitting operation can cause print material to be ejected from the nozzle of the printhead 106 so that print material having the increased colorant concentration can be removed before normal print material can be applied to a physical medium during a print job. A decap spitting operation can spit a small amount of print material relative to a printhead recovery spitting operation or a printhead change spitting operation, as is further described herein.

In some examples, a spitting operation type can include a printhead recovery spitting operation. As used herein, the term “printhead recovery spitting operation” refers to a spitting operation to unclog a printhead nozzle. For example, if the imaging device 100 goes unused for a period of time, print material at the printhead nozzle can dry out, causing the printhead nozzle to become clogged. Accordingly, a printhead recovery spitting operation can cause print material to be ejected from the nozzle of the printhead 106 (e.g., at high pressure) in order to cause print material clogging the printhead nozzle to be forced out of the nozzle. A printhead recovery spitting operation can spit a larger amount of print material relative to a decap spitting operation.

In some examples, a spitting operation type can include a printhead change spitting operation. As used herein, the term “printhead change spitting operation” refers to a spitting operation to prime a printhead. For example, a printhead 106 may be removed and/or replaced. Accordingly, a printhead change spitting operation can cause print material to be ejected from the nozzle of the printhead 106 to prime the printhead. A printhead change spitting operation can spit a larger amount of print material relative to a decap spitting operation.

Although the spitting operation types are described above as including a decap spitting operation, a printhead recovery spitting operation, and/or a printhead change spitting operation, examples of the disclosure are not so limited. For example, the spitting operation type can include any other type of spitting operation.

In some examples, the predetermined reservoir data can include a print material fill amount of each of the reservoirs 104-1, 104-2, 104-3. For example, the controller 102 can log spit amounts into each of the reservoirs 104-1, 104-2, and/or 104-3 to determine a fill amount of print material in each of the reservoirs 104-1, 104-2, and/or 104-3. In conjunction with the known dimensions of the reservoirs 104-1, 104-2, and/or 104-3, the controller 102 can determine the fill amount of print material in each of the reservoirs 104-1, 104-2, 104-3 (e.g., utilizing the volume and amount of print material spit into each of the reservoirs 104-1, 104-2, 104-3).

In some examples, the imaging device 100 can include a sensor (e.g., not illustrated in FIG. 1) to determine the fill amount of print material in each of the reservoirs 104-1, 104-2, 104-3. For example, the sensor can be a visual sensor, a weight sensor, and/or any other type of sensor to determine a fill amount of print material in each of the reservoirs 104-1, 104-2, 104-3.

Although the predetermined reservoir data is described above as including dimensions of the reservoirs 104-1, 104-2, 104-3, allowable spitting operation types, and/or print material fill amount of the reservoirs 104-1, 104-2, 104-3, examples of the disclosure are not so limited. For example, the predetermined reservoir data can include any other data that describes attributes and/or characteristics of the reservoirs 104-1, 104-2, 104-3.

As described above, the controller 102 can determine a reservoir 104 for a type of spitting operation of the printhead 106 based on predetermined reservoir data. For example, the controller 102 can determine reservoir 104-1 for a printhead recovery spitting operation based on the reservoir 104-1 allowing for a printhead recovery spitting operation and the reservoir 104-1 supporting a particular spit type, as is further described herein.

As another example, the controller 102 can determine the reservoir 104-2 based on a print material fill amount of the reservoir 104-2 being less than a threshold capacity amount. For example, the controller 102 can determine the print material fill amount (e.g., based on the dimensions of the reservoir 104-2 and the logged (e.g., past) spit amounts into the reservoir 104-2) and in response to the print material fill amount being less than the threshold capacity amount, determine the reservoir 104-2. In an example in which the print material fill amount is greater than a threshold capacity amount, the controller 102 can determine a different reservoir 104. In some examples, the controller 102 can cause the imaging device to generate an alert in response to the print material fill amount of a reservoir 104 being greater than a threshold capacity amount.

In some examples, in addition to the predetermined reservoir data, the controller 102 can determine the reservoir 104 based on a print job type. As used herein, the term "print job type" refers to a group of characteristics that describe a particular manner as to how print material is transferred to a physical medium, the type of physical medium, etc. For example, the print job type can include attributes that describe the print job. For instance, print job attributes can include a size of the physical medium (e.g., Letter, Legal, Tabloid, A0, A1, A2, A3, A4, etc.), an amount of the physical medium to be printed (e.g., 10 sheets), a type of the physical medium (e.g., paper, photopolymers, plastics, composite, metal, wood, etc.), a print job performance parameter to indicate speed/throughput of the print job, among other attributes.

For example, the controller 102 can determine, based on a print job type including 10 sheets of A4 paper at a specified throughput, reservoir 104-2 for a decap spitting operation based on the reservoir 104-2 allowing for a decap spitting operation and the reservoir 104-2 being located proximate to the print carriage 105 to allow the imaging device 100 to accomplish the print job at the specified throughput. That is, the print job type may specify a particular speed/throughput, a paper size, and/or other print job attributes, and the controller 102 can determine a reservoir 104 accordingly.

As illustrated in FIG. 1, the imaging device 100 can include the plurality of reservoirs 104-1, 104-2, 104-3. In some examples, the reservoirs 104-1, 104-2, 104-3 can include a priority parameter. As used herein, the term "priority parameter" refers to an attribute that describes a location of the reservoirs 104-1, 104-2, 104-3 relative to a fixed point. For example, reservoir 104-1 can include a first priority parameter, reservoir 104-2 can include a second priority parameter, and reservoir 104-3 can include a third priority parameter. Such priority parameters can be based on a travel distance of the print carriage 105 from an initial location to the reservoir 104. For example, the first priority parameter of reservoir 104-1 can indicate that reservoir 104-1 is the closest reservoir to the print carriage 105 at the initial location of the print carriage 105, the second priority parameter of reservoir 104-2 can indicate that reservoir 104-2 is the second closest reservoir to the print carriage 105 at the initial location of the print carriage 105, and the third priority parameter of reservoir 104-3 can indicate that reservoir 104-3 is the third closest reservoir to the print carriage 105 at the initial location of the print carriage 105.

The controller 102 can determine the reservoir to be the reservoir 104-1 based on the first priority parameter having a higher priority than the second priority parameter and the third priority parameter, as well as the print job type. For example, the controller 102 can determine, based on the print job type including 10 sheets of A4 paper at a specified throughput according to a print job performance parameter, reservoir 104-1 for a decap spitting operation in order to enable a higher paper throughput by reducing a travel time for the print carriage 105 during a decap spitting operation type.

When a reservoir 104 is determined, the controller 102 can determine a spit type for the spitting operation based on the type of spitting operation and the predetermined reservoir data. As used herein, the term "spit type" refers to a group of characteristics that describe print material ejection locations. For example, the spit type for a spitting operation can describe where a spitting operation type occurs in a reservoir 104, as is further described herein.

In some examples, the spit type can include a fixed-point spit type. As used herein, the term "fixed-point spit type" refers to ejection of print material from a nozzle of a printhead in one location in a reservoir. For example, the printhead 106 can eject print material in one location in the reservoir 104-1, 104-2, 104-3. In some examples, the controller 102 can determine the spit type to be a fixed-point spit type in response to a dimension of the reservoir 104-1, 104-2, 104-3 being less than a threshold amount, as is further described in connection with FIG. 2.

In some examples, the spit type can include a randomized point spit type. As used herein, the term "randomized point spit type" refers to ejection of print material from a nozzle of a printhead in random locations in a reservoir. For example, the printhead 106 can eject print material in random locations in the reservoir 104-1, 104-2, 104-3, where the random locations are generated using a random number generator. In some examples, the controller 102 can determine the spit type to be a randomized point spit type in response to the reservoir 104-1, 104-2, 104-3 including a restricted zone for spitting, as is further described in connection with FIG. 3. In some examples, the controller 102 can determine the spit type to be a randomized point spit type in response to a print job type, as is further described in connection with FIG. 3

In some examples, the spit type can include a spit-on-slew spit type. As used herein, the term "spit-on-slew spit type" refers to ejection of print material from a nozzle of a printhead through a range of locations in the reservoir as the printhead moves. For example, the printhead 106 can eject print material as it moves across a pre-defined range of locations in the reservoir 104-1, 104-2, 104-3, In some examples, the controller 102 can determine the spit type to be a spit-on-slew spit type in response to a spitting operation including an amount of print material that exceeds a threshold amount, as is further described in connection with FIG. 4.

Although the spit types are described above as including a fixed-point spit type, a randomized point spit type, and/or a spit-on-slew spit type, examples of the disclosure are not so limited. For example, the spit type can be any other spit type.

As described above, the controller 102 can determine a spit type for the spitting operation of the printhead 106 based on the type of spitting operation and the predetermined reservoir data. For example, the controller 102 can determine, based on a print job type including 10 sheets of A4 paper at a specified throughput, reservoir 104-2 for a decap spitting operation based on the reservoir 104-2 allowing fora decap spitting operation, the reservoir 104-2 being located proximate to the print carriage 105 to allow the imaging device 100 to accomplish the print job at the specified throughput, and determine the spit type to be a fixed-point spit type.

The controller 102 can cause the spitting operation to occur in the reservoir 104. Continuing with the example above, the controller 102 can cause the printhead 106 to eject print material to the reservoir 104-2 according to a fixed-point spit type.

Spitting operations for printheads according to the disclosure can allow for utilization of areas in an imaging device as reservoirs in order to increase reservoir capacity and reduce costs for manufacturing and/or production of imaging devices. Additionally, performance and/or a life-cycle of the imaging device can be increased without redesign of imaging device hardware and/or use of additional mechanisms which may lead to an increase in user satisfaction.

Figure 2:
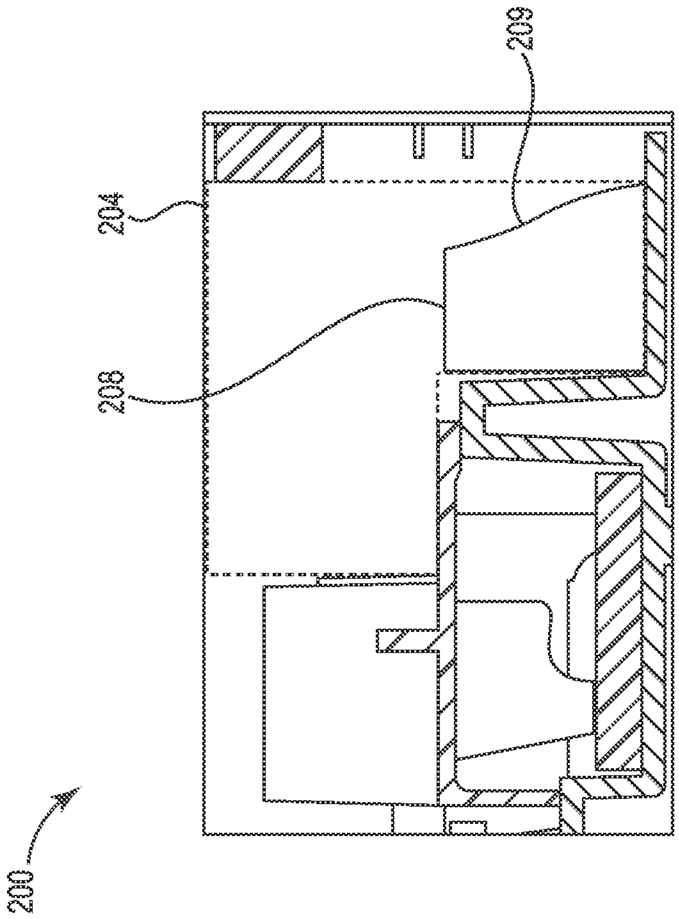
FIG. 2 is a partial side section view of a reservoir of an imaging device for spitting operations for printheads consistent with the disclosure.

FIG. 2 is a partial side section view of a reservoir 204 of an imaging device 200 for spitting operations for printheads consistent with the disclosure. The imaging device 200 can include a reservoir 204, a spit location 208, and print material 209.

As illustrated in FIG. 2, the imaging device 200 can include a reservoir 204, A controller can utilize the reservoir 204 for spitting operations, as is further described herein. Additionally, although the imaging device 200 is illustrated as including a single reservoir 204, examples of the disclosure are not so limited. For instance, the imaging device 200 may include a second reservoir (e.g., a main reservoir, secondary reservoir, or tertiary reservoir), a third reservoir, etc.

As previously described in connection with FIG. 1, a controller (e.g., not illustrated in FIG. 2) of the imaging device 200 can determine a spit type for the spitting operation of a printhead based on the type of spitting operation and the predetermined reservoir data. For example, the controller can determine, based on a print job type including 10 sheets of paper sized A4 at a specified throughput, reservoir 204 for a decap spitting operation based on the reservoir 204 allowing for a decap spitting operation, the reservoir 204 being located proximate to the print carriage to allow the imaging device 200 to accomplish the print job at the specified throughput, and a fill capacity of the reservoir 204 being less than a threshold fill amount, and determine the spit type to be a fixed-point spit type.

As previously described in connection with FIG. 1, a controller (e.g., not illustrated in FIG. 2) of the imaging device 200 can determine a spit location 208 in the reservoir 204 in response to the spit type being a fixed-point spit type. For example, the fixed-point spit type can be a spit type such that the controller can cause print material 209 to be ejected from a nozzle of a printhead (e.g., not illustrated in FIG. 2) at a single spit location 208 in the reservoir 204. In other words, the controller can cause the spitting operation to occur at the spit location 208. As spitting operations occur, print material 209 can be deposited in the reservoir 204.

In some examples, the controller can determine the spit type to be a fixed-point spit type in response to a dimension of the reservoir being less than a threshold amount. For example, a width dimension of the reservoir 204 may be less than, for instance, 10 millimeters (mm). As a smaller width dimension may be more conducive to a fixed-point spit type, the controller can determine the spit type to be a fixed-point spit type for the reservoir 204.

Figure 3:
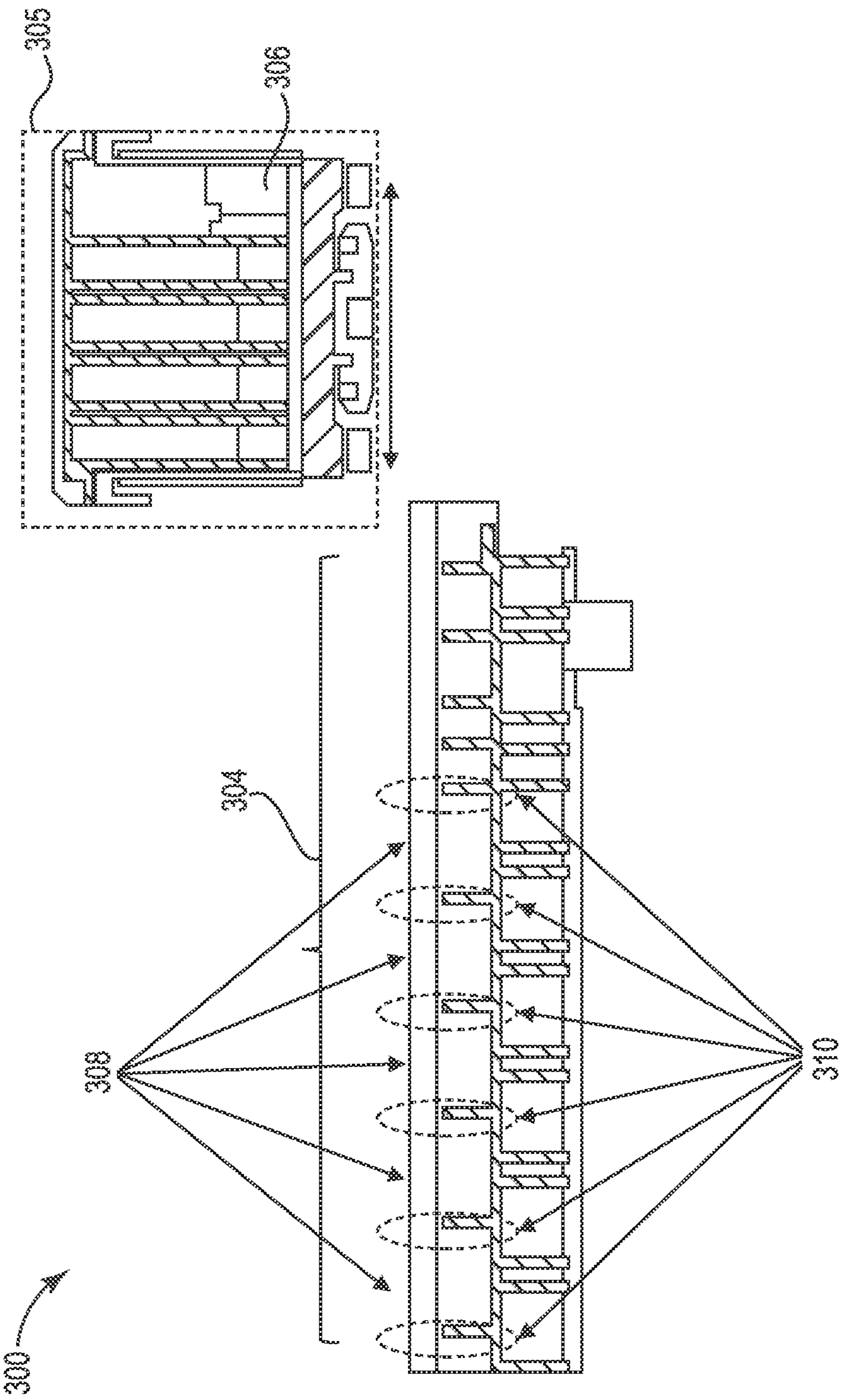
FIG. 3 is a partial side section view of a printhead and a reservoir including restricted zones for spitting operations for printheads consistent with the disclosure.

FIG. 3 is a partial side section view of a printhead 306 and a reservoir 304 including restricted zones 310 for spitting operations for printheads consistent with the disclosure. The imaging device 300 can include a reservoir 304, spit locations 308, restricted zones 310, print carriage 305, and printhead 306.

As illustrated in FIG. 3, the imaging device 300 can include a partial view of a reservoir 304. The reservoir 304 can be, for example, a portion of a large format imaging device. For example, the imaging device 300 may perform print jobs with paper sizes as large as A0, among other examples. Although the imaging device 300 is capable of printing large paper sizes (e.g., such as A0), the imaging device 300 may perform print jobs with smaller paper sizes such that the area designed as the reservoir 304 may go unused. Accordingly, a controller can utilize the reservoir 304 for spitting operations, as is further described herein. Additionally, although the imaging device 300 is illustrated as including a single reservoir 304, examples of the disclosure are not so limited. For instance, the imaging device 300 may include a second reservoir (e.g., a main reservoir, secondary reservoir, or tertiary reservoir), a third reservoir, etc.

As previously described in connection with FIG. 1, a controller (e.g., not illustrated in FIG. 3) of the imaging device 300 can determine a spit type for the spitting operation of the printhead 306 based on the type of spitting operation and the predetermined reservoir data. For example, the controller can determine, based on a print job type including 10 sheets of paper sized less than A0 at a specified throughput, reservoir 304 for a decap spitting operation based on the reservoir 304 allowing for a decap spitting operation, the reservoir 304 being located proximate to the print carriage 305 to allow the imaging device 300 to accomplish the print job at the specified throughput, and a fill capacity of the reservoir 304 being less than a threshold fill amount, and determine the spit type to be a randomized point spit type.

The controller can determine a plurality of spit locations in the reservoir 304 using a random number generator in response to the spit type being a randomized point spit type. As used herein, the term "random number generator" refers to a method, performed by a processing resource, of generating a sequence of numbers whose properties approximate a sequence of random numbers. That is, the controller can utilize a pseudorandom number generator to generate a sequence of numbers, where each number included in the sequence of numbers is associated with a physical location in the reservoir 304. For example, the controller can generate random numbers that can correspond to spit locations 308 in the reservoir 304, and the controller can cause spitting operations to occur at the spit locations 308.

In some examples, the controller can determine the spit type to be a randomized point spit type in response to a print job type. For example, if a print job type includes a print performance parameter that specifies a throughput condition of physical media, the controller can determine the spit type to be a randomized point spit type.

In some examples, the reservoir 304 can include restricted zones 308 for spitting. As used herein, the term "restricted zone" refers to an area of a reservoir that spitting operations are not to be conducted on. For example, the imaging device 300 can include restricted zones 308 such as structural ribs, where the structural ribs are restricted zones 308. Accordingly, the controller can cause the controller to determine a spit type to be a randomized point spit type in response to the reservoir 304 including restricted zones 308, and can cause the printhead 306 to perform spitting operations anywhere in the reservoir 304 except at the restricted zones 308.

Figure 4:
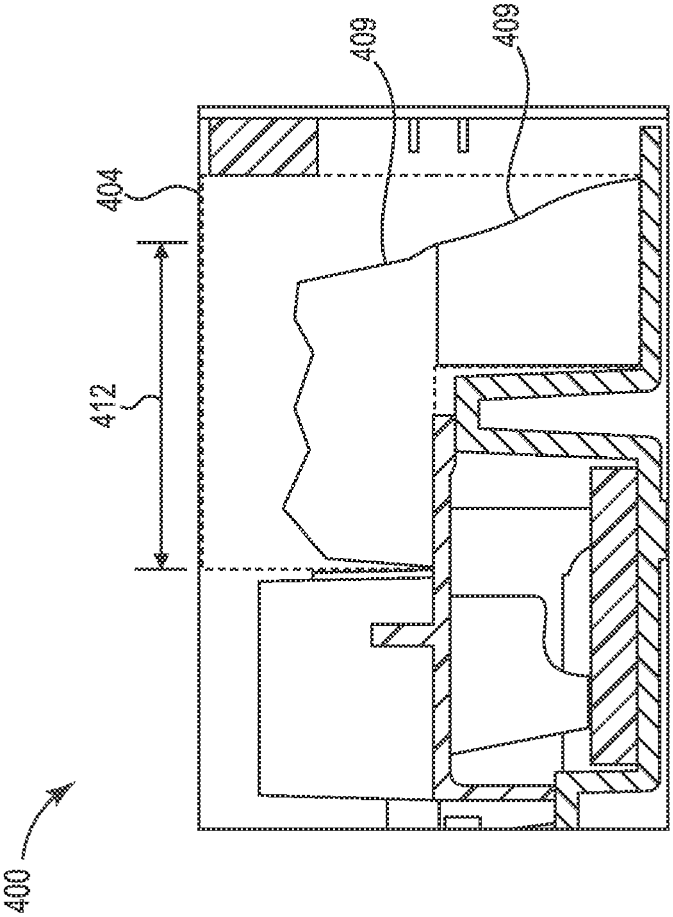
FIG. 4 is a partial side section view of a reservoir of an imaging device for spitting operations for printheads consistent with the disclosure.

FIG. 4 is a partial side section view of a reservoir 404 of an imaging device 400 for spitting operations for printheads consistent with the disclosure. The imaging device 400 can include a reservoir 404, range of spit locations 412, and print material 409.

As illustrated in FIG. 4, the imaging device 400 can include a reservoir 404. The reservoir 404 can be, in some examples, the reservoir 204 previously described in connection with FIG. 2. A controller can utilize the reservoir 404 for spitting operations, as is further described herein, Additionally, although the imaging device 400 is illustrated as including a single reservoir 404, examples of the disclosure are not so limited. For instance, the imaging device 400 may include a second reservoir (e.g., a main reservoir, secondary reservoir, or tertiary reservoir), a third reservoir, etc.

As previously described in connection with FIG. 1, a controller (e.g., not illustrated in FIG. 4) of the imaging device 400 can determine a spit type for the spitting operation of a printhead based on the type of spitting operation and the predetermined reservoir data. For example, the controller can determine, based on a print job type including 10 sheets of paper sized A4 at a specified throughput, reservoir 404 for a decap spitting operation based on the reservoir 404 allowing for a decap spitting operation, the reservoir 404 being located proximate to the print carriage to allow the imaging device 400 to accomplish the print job at the specified throughput, and a fill capacity of the reservoir 404, and determine the spit type to be a spit-on-slew spit type.

The controller can determine a range of spit locations 412 in the reservoir 404 in response to the spit type being a spit-on-slew spit type. For example, the spit-on-slew spit type can be a spit type such that the controller can cause print material 409 to be ejected from a nozzle of a printhead (e.g., not illustrated in FIG. 2) across the range of spit locations 412 in the reservoir 404. In other words, the controller can cause the spitting operation to occur while the printhead is moving across the range of spit locations 412. As spitting operations occur, print material 409 can be deposited in the reservoir 404 across the range of spit locations 412.

In some examples, the controller can determine the spit type to be a spit-on-slew spit type in response to a spitting operation that includes an amount of print material that exceeds a threshold amount. For example, the spitting operation can be a printhead recovery spitting operation. As a large amount of print material may be ejected from the nozzle of the printhead (e.g., relative to a decap spitting operation), a spit-on-slew spit type may allow for ejected print material 409 to be more evenly distributed in the reservoir 404 relative to a fixed-point spit type.

In some examples, the reservoir 404 can be similar to reservoir 204, as previously described in connection with FIG. 2. As previously described in connection with FIG. 2, the printhead may deposit print material 409 into the reservoir 404 using a fixed-point spit type. As such spitting operations occur, print material 409 may build such that a fill capacity of the reservoir 404 may exceed a predetermined fill capacity. In some examples, therefore, the controller of the imaging device 400 can modify the predetermined reservoir data for reservoir 404 so that the supported spit types no longer include fixed-point spitting as a result of the fill capacity of the reservoir 404 exceeding a predetermined fill capacity. In such an example, the predetermined reservoir data for reservoir 404 may be modified to support spit-on-slew spit types. Accordingly, the controller can determine the reservoir 404 for use for a particular spitting operation for spit-on-slew spit types. As a result, while the reservoir 404 may be utilized for faster spitting operation/spit types (e.g., using fixed-point spitting), the imaging device 400 can switch to a different kind of spit type in order to maximize remaining volume of the reservoir 404 to extend a lifecycle of the imaging device when a print material fill amount in the reservoir 404 exceeds a predetermined amount.

Figure 5:
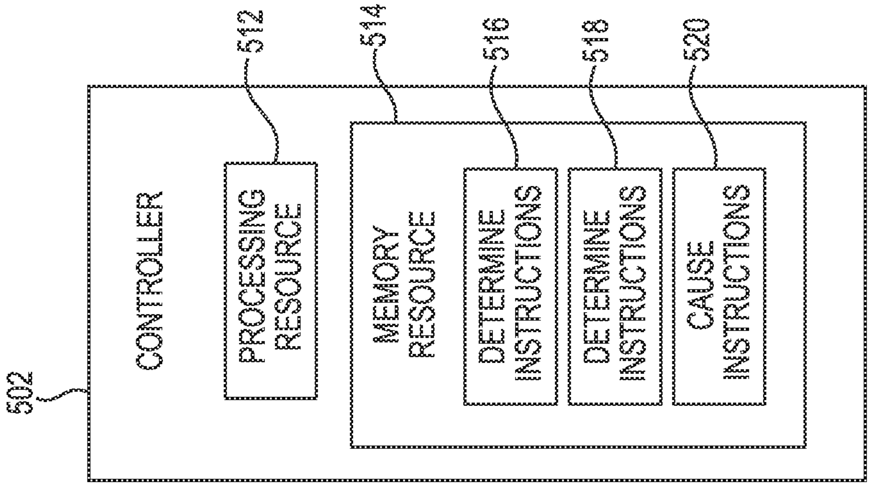
FIG. 5 is an example of a controller for spitting operations for printheads.

FIG. 5 is an example of a controller 502 for spitting operations for printheads. As described herein, the controller 502 may perform functions related to spitting operations for printheads. Although not illustrated in FIG. 5, the controller 502 may include a processor and a machine-readable storage medium. Although the following descriptions refer to a single processor and a single machine-readable storage medium, the descriptions may also apply to a system with multiple processors and multiple machine-readable storage mediums. In such examples, the controller 502 may be distributed across multiple machine-readable storage mediums and across multiple processors. Put another way, the instructions executed by the controller 502 may be stored across multiple machine-readable storage mediums and executed across multiple processors, such as in a distributed or virtual computing environment.

Processing resource 512 may be a central processing unit (CPU), a semiconductor-based microprocessor, and/or other hardware devices suitable for retrieval and execution of machine-readable instructions 516, 518, 520 stored in a memory resource 514. Processing resource 512 may fetch, decode, and execute instructions 516, 518, 520. As an alternative or in addition to retrieving and executing instructions 516, 518, 520, processing resource 512 may include a plurality of electronic circuits that include electronic components for performing the functionality of instructions 516, 518, 520.

Memory resource 514 may be any electronic, magnetic, optical, or other physical storage device that stores executable instructions 516, 518, 520, and/or data. Thus, memory resource 514 may be, for example, Random Access Memory (RAM), an Electrically-Erasable Programmable Read-Only Memory (EEPROM), a storage drive, an optical disc, and the like. Memory resource 514 may be disposed within controller 502, as shown in FIG. 5. Additionally, memory resource 514 may be a portable, external or remote storage medium, for example, that causes controller 502 to download the instructions 516, 518, 520 from the portable/external/remote storage medium.

The controller 502 may include instructions 516 stored in the memory resource 514 and executable by the processing resource 512 to determine a reservoir for a spitting operation of a printhead in an imaging device based on predetermined reservoir data. A spitting operation can include a spitting operation type. Such spitting operation types can include decap spitting operations, printhead recovery spitting operations, and/or printhead change spitting operations, among other spitting operation types. Predetermined reservoir data can include dimensions of a reservoir, allowable spitting operation types, and/or a print material fill amount of the reservoir.

The controller 502 may include instructions 518 stored in the memory resource 514 and executable by the processing resource 512 to determine a spit type for the spitting operation of the printhead. The spit type can include a fixed-point spit type, a randomized point spit type, and/or a spit-on-slew spit type.

The controller 502 may include instructions 520 stored in the memory resource 514 and executable by the processing resource 512 to cause the spitting operation to occur in the reservoir using the determined spit type. For example, a printhead can cause print material to be ejected from a nozzle of the printhead to the reservoir according for the spitting operation according to the determined spit type.

Figure 6:
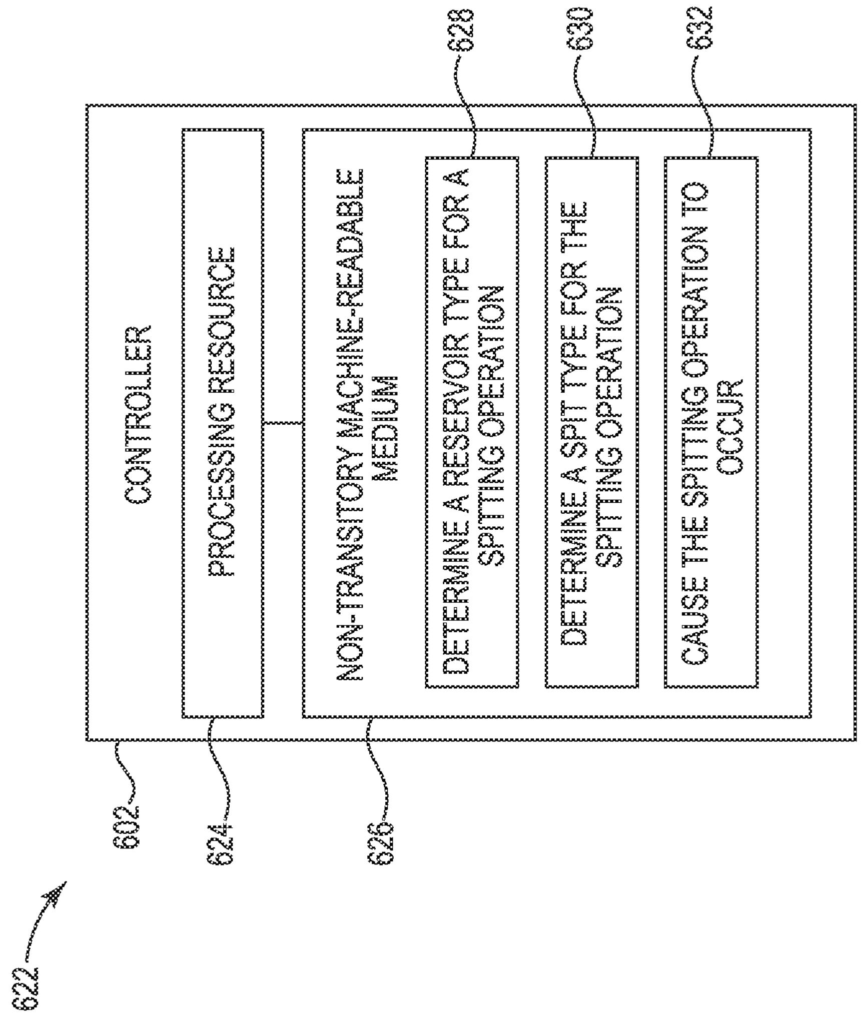
FIG. 6 is a block diagram of an example system for spitting operations for printheads consistent with the disclosure.

FIG. 6 is a block diagram of an example system 622 for spitting operations for printheads consistent with the disclosure. In the example of FIG. 6, system 622 includes a controller 602 including a processing resource 624 and a non-transitory machine-readable storage medium 626. Although the following descriptions refer to a single processing resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processing resource 624 may be a central processing unit (CPU), microprocessor, and/or other hardware device suitable for retrieval and execution of instructions stored in machine-readable storage medium 626. In the particular example shown in FIG. 6, processing resource 624 may receive, determine, and send instructions 628, 630, 632. As an alternative or in addition to retrieving and executing instructions, processing resource 624 may include an electronic circuit comprising a number of electronic components for performing the operations of the instructions in machine-readable storage medium 626, With respect to the executable instruction representations or boxes described and shown herein, it should be understood that part or all of the executable instructions and/or electronic circuits included within one box may be included in a different box shown in the figures or in a different box not shown.

Machine-readable storage medium 626 may be any electronic, magnetic, optical, or other physical storage device that stores executable instructions. Thus, machine-readable storage medium 626 may be, for example, Random Access Memory (RAM), an Electrically-Erasable Programmable Read-Only. Memory (EEPROM), a storage drive, an optical disc, and the like. The executable instructions may be "installed" on the system 622 illustrated in FIG. 6. Machine-readable storage medium 626 may be a portable, external or remote storage medium, for example, that allows the system 622 to download the instructions from the portable/external/remote storage medium. In this situation, the executable instructions may be part of an "installation package".

Determine a reservoir type for a spitting operation instructions 628, when executed by a processor such as processing resource 624, may cause system 622 to determine a reservoir for a type of spitting operation of a printhead in an imaging device based on predetermined reservoir data. A spitting operation can include a spitting operation type. Such spitting operation types can include decap spitting operations, printhead recovery spitting operations, and/or printhead change spitting operations, among other spitting operation types. Predetermined reservoir data can include dimensions of a reservoir, allowable spitting operation types, and/or a print material fill amount of the reservoir.

Determine a spit type for the spitting operation instructions 630, when executed by a processor such as processing resource 624, may cause system 622 to determine a spit type for the spitting operation of the printhead based on the type of spitting operation and the predetermined reservoir data. Spit types can include a fixed-point spit type, a randomized point spit type, and/or a spit-on-slew spit type.

Cause the spitting operation to occur instructions 632, when executed by a processor such as processing resource 624, may cause system 622 to cause the spitting operation to occur in the reservoir according to the determined spit type. For example, a printhead can cause print material to be ejected from a nozzle of the printhead to the reservoir according for the spitting operation according to the determined spit type.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 100 may refer to element 100 in FIG. 1 and an analogous element may be identified by reference numeral 200 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A controller, comprising:

a processing resource; and a memory resource storing machine-readable instructions to cause the processing resource to:

determine a reservoir from a plurality of reservoirs to receive print material for a spitting operation of a printhead in an imaging device based on predetermined reservoir data;

determine a spit type for the spitting operation of the printhead; and cause the spitting operation to occur in the reservoir using the determined spit type.

2. The controller of claim 1, wherein the processing resource is to determine the spit type to be a fixed-point spit type in response to a dimension of the reservoir being less than a threshold amount.

3. The controller of claim 1, wherein the processing resource is to determine the spit type to be a randomized point spit type in response to the reservoir including a restricted zone for spitting.

4. The controller of claim 1, wherein the processing resource is to determine the spit type to be a randomized point spit type in response to a print job type.

5. The controller of claim 1, wherein the processing resource is to determine the spit type to be a spit-on-slew spit type in response to the spitting operation including an amount of print material that exceeds a threshold amount.

6. The controller of claim 1, wherein the processing resource is to further determine the reservoir for the spitting operation based on a print job type.

7. The controller of claim 1, wherein the processing resource is to cause the spitting operation to occur by causing the printhead to eject print material to the reservoir.

8. A non-transitory machine-readable storage medium including instructions that when executed cause a processing resource to:

determine a reservoir from a plurality of reservoirs to receive print material for a type of spitting operation of a printhead in an imaging device based on predetermined reservoir data, wherein the predetermined reservoir data includes:

a print material fill amount of the reservoir;

allowable spitting operation types; and reservoir dimensions;

determine a spit type for the spitting operation of the printhead based on the type of spitting operation and the predetermined reservoir data; and cause the spitting operation to occur in the reservoir according to the determined spit type.

9. The non-transitory storage medium of claim 8, including instructions to cause the processing resource to determine the reservoir based on the print material fill amount of the reservoir being less than a threshold capacity amount.

10. The non-transitory storage medium of claim 8, including instructions to cause the processing resource to:

determine a spit location in the reservoir in response to the spit type being a fixed-point spit type; and cause the spitting operation to occur at the spit location.

11. The non-transitory storage medium of claim 8, including instructions to cause the processing resource to:

determine a plurality of spit locations in the reservoir using a random number generator in response to the spit type being a randomized point spit type; and cause the spitting operation to occur at the plurality of spit locations.

12. The non-transitory storage medium of claim 8, including instructions to cause the processing resource to:

determine a range of spit locations in the reservoir in response to the spit type being a spit-on-slew spit type; and cause the spitting operation to occur at the range of spit locations.

13. An imaging device, comprising:

a plurality of reservoirs;

a print carriage including a printhead; and a controller, wherein the controller is to:

determine a reservoir from the plurality of reservoirs to receive print material for a type of spitting operation of the printhead based on predetermined reservoir data and a print job type;

determine a spit type for the spitting operation of the printhead based on the type of spitting operation and the predetermined reservoir data; and cause the spitting operation to occur in the reservoir by causing the printhead to eject print material to the reservoir according to the determined spit type.

14. The imaging device of claim 13, wherein:

the plurality of reservoirs includes a first reservoir having a first priority parameter and a second reservoir having a second priority parameter; and the controller is to determine the reservoir to be the first reservoir based on the first priority parameter having a higher priority than the second priority parameter and the print job type.

15. The imaging device of claim 13, wherein the type of spitting operation includes at least one of:

a decap spitting operation;

a printhead recovery spitting operation; and a printhead change spitting operation.

* * * * *